(12) United States Patent
Nakai (10) Patent No.: US 7,944,276 B2
(45) Date of Patent: May 17, 2011

(54) CHARGE PUMP CIRCUIT AND ELECTRONIC APPARATUS PROVIDED WITH THE SAME

(75) Inventor: Takayuki Nakai, Osaka (JP)

(73) Assignee: Panasonic Corporation, Osaka (JP)

( * ) Notice: Subject to any disclaimer, the term of this patent is extended or adjusted under 35 U.S.C. 154(b) by 58 days.

(21) Appl. No.: 12/265,189

(22) Filed: Nov. 5, 2008

(65) Prior Publication Data

US 2009/0195298 A1    Aug. 6, 2009

(30) Foreign Application Priority Data

Jan. 31, 2008    (JP) ................................ 2008-021475

(51) Int. Cl.
*G05F 1/10*    (2006.01)
(52) U.S. Cl. ......................................... 327/536; 363/60
(58) Field of Classification Search .................. 327/536; 363/59–60
See application file for complete search history.

(56) References Cited

U.S. PATENT DOCUMENTS

| | | | | |
|---|---|---|---|---|
| 5,081,371 A | * | 1/1992 | Wong | 327/536 |
| 6,023,188 A | * | 2/2000 | Lee et al. | 327/536 |
| 6,310,789 B1 | | 10/2001 | Nebrigic et al. | |
| 6,320,797 B1 | * | 11/2001 | Liu | 365/189.11 |
| 6,518,828 B2 | * | 2/2003 | Seo et al. | 327/534 |
| 6,734,718 B1 | * | 5/2004 | Pan | 327/536 |
| 7,187,159 B2 | | 3/2007 | Katoh | |
| 7,224,591 B2 | * | 5/2007 | Kaishita et al. | 363/60 |
| 7,271,642 B2 | * | 9/2007 | Chen et al. | 327/514 |
| 7,307,385 B2 | | 12/2007 | Yamamoto et al. | |
| 7,511,561 B2 | * | 3/2009 | Nagatomo et al. | 327/536 |
| 7,545,658 B2 | * | 6/2009 | Thiele et al. | 363/60 |
| 7,554,385 B2 | * | 6/2009 | Ishida | 327/536 |
| 2006/0203407 A1 | | 9/2006 | Katoh | |
| 2007/0145964 A1 | | 6/2007 | Katoh | |
| 2007/0146051 A1 | * | 6/2007 | Tsen | 327/536 |
| 2008/0116958 A1 | * | 5/2008 | Ko et al. | 327/536 |
| 2009/0002064 A1 | * | 1/2009 | Tanaka | 327/543 |

FOREIGN PATENT DOCUMENTS

JP    63-217971    9/1988

* cited by examiner

*Primary Examiner* — Thomas J Hiltunen
(74) *Attorney, Agent, or Firm* — McDermott Will & Emery LLP (57) ABSTRACT

A pumping circuit includes: a pumping capacitance; a first drive transistor connected between an input node for receiving an input voltage and one terminal of the pumping capacitance; and a second drive transistor connected between an output node for outputting an output voltage and the one terminal of the pumping capacitance. In a charge storing mode, the first drive transistor is turned ON to store charge in the pumping capacitance, while in a charge transfer mode, the second drive transistor is turned ON to transfer the charge stored in the pumping capacitance to the output node. The protection circuit puts at least one of the first and second drive transistors in a high-resistance state in which the resistance value is higher than when the transistor is ON, based on whether the output voltage is higher or lower than a predetermined judgment voltage.

18 Claims, 11 Drawing Sheets

CHARGE PUMP CIRCUIT AND ELECTRONIC APPARATUS PROVIDED WITH THE SAME

BACKGROUND OF THE INVENTION

The present invention relates to a charge pump circuit for stepping up or down an input voltage to output a stepped-up or stepped-down output voltage, and more particularly, to a technique of preventing overcurrent-caused circuit breakdown.

Conventionally, charge pump circuits are widely known as power supply circuits that can be implemented in a comparatively simple configuration. The charge pump circuits include step-up (boost) charge pump circuits that step up an input voltage to output a positive output voltage and step-down charge pump circuits that step down an input voltage to output a negative output voltage.

Figure 10:
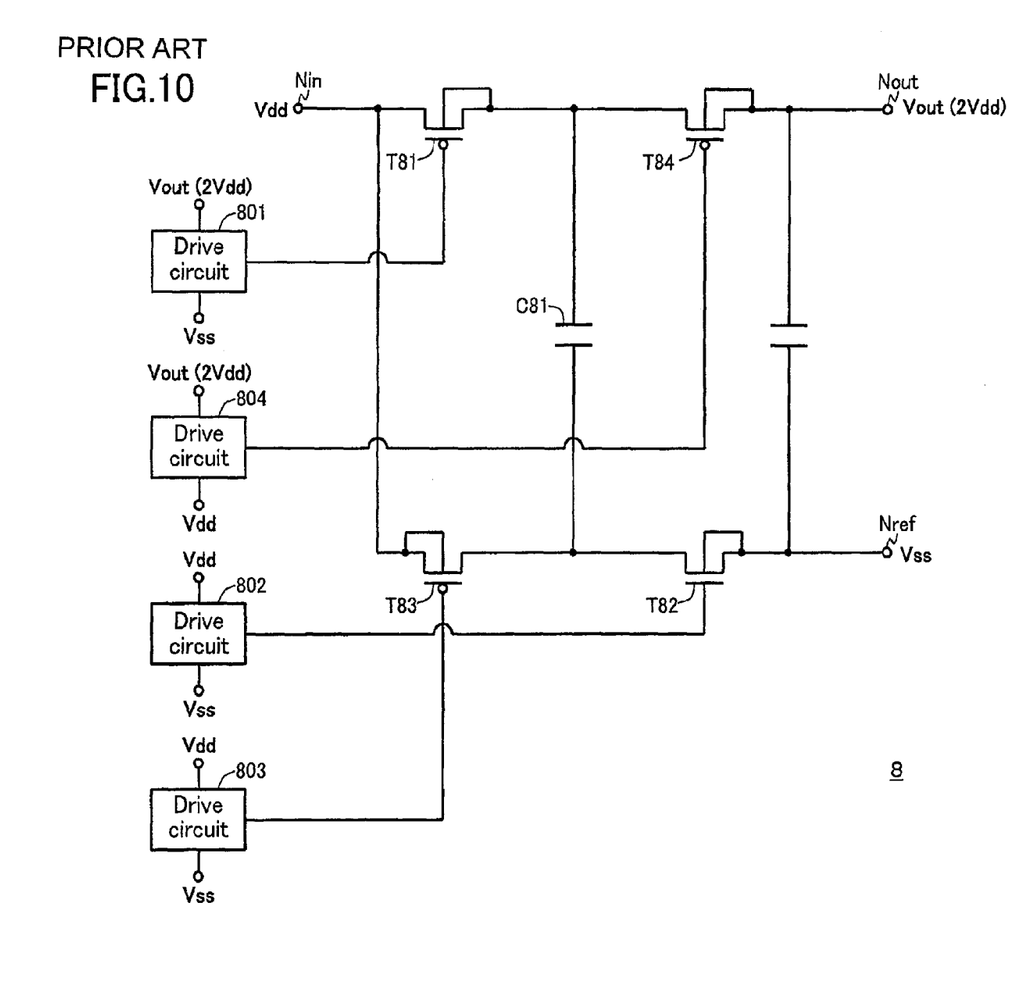
FIG. 10 is a view showing a conventional step-up charge pump circuit.

FIG. 10 shows a configuration of a general step-up charge pump circuit, which executes a charge storing operation for storing charge in a pumping capacitance C81 and a charge transfer operation for transferring the charge stored in the pumping capacitance C81 alternately, to thereby output a positive output voltage Vout (=2Vdd) having a voltage value twice as large as the power supply voltage Vdd.

During a charge storing period (during which the charge storing operation is executed), drive circuits 801, 802, 803 and 804 respectively output the ground voltage Vss, the power supply voltage Vdd, the power supply voltage Vdd and the output voltage Vout. With these voltages, drive transistors T81 and T82 are ON while drive transistors T83 and T84 are OFF, resultantly allowing the pumping capacitance C81 to store an amount of charge (positive charge) corresponding to the voltage difference between the power supply voltage Vdd and the ground voltage Vss.

During a charge transfer period (during which the charge transfer operation is executed), the drive circuits 801, 802, 803 and 804 respectively output the output voltage Vout, the ground voltage Vss, the ground voltage Vss and the power supply voltage Vdd. With these voltages, the drive transistors T83 and T84 are ON while the drive transistors T81 and T82 are OFF, resultantly allowing the charge (positive charge) stored in the pumping capacitance C81 to be transferred to an output node Nout.

In the step-up charge pump circuit, the drive transistors T81 and T84 can be turned OFF by supplying the output voltage Vout (2Vdd) to the gates thereof. However, if a short-to-ground fault of the output node Nout (short-circuiting between the output node Nout and an unintentional low-voltage node (ground node, for example)) occurs, the output voltage Vout at the output node Nout may become lower than the power supply voltage Vdd. In such an event, the drive transistors T81 and T84 will not be turned OFF but be ON even if the output voltage Vout is supplied to the gates of the drive transistors T81 and T84. Hence, both the drive transistors T81 and T84 will be ON simultaneously, causing an overcurrent between an input node Nin and the output node Nout.

Figure 11:
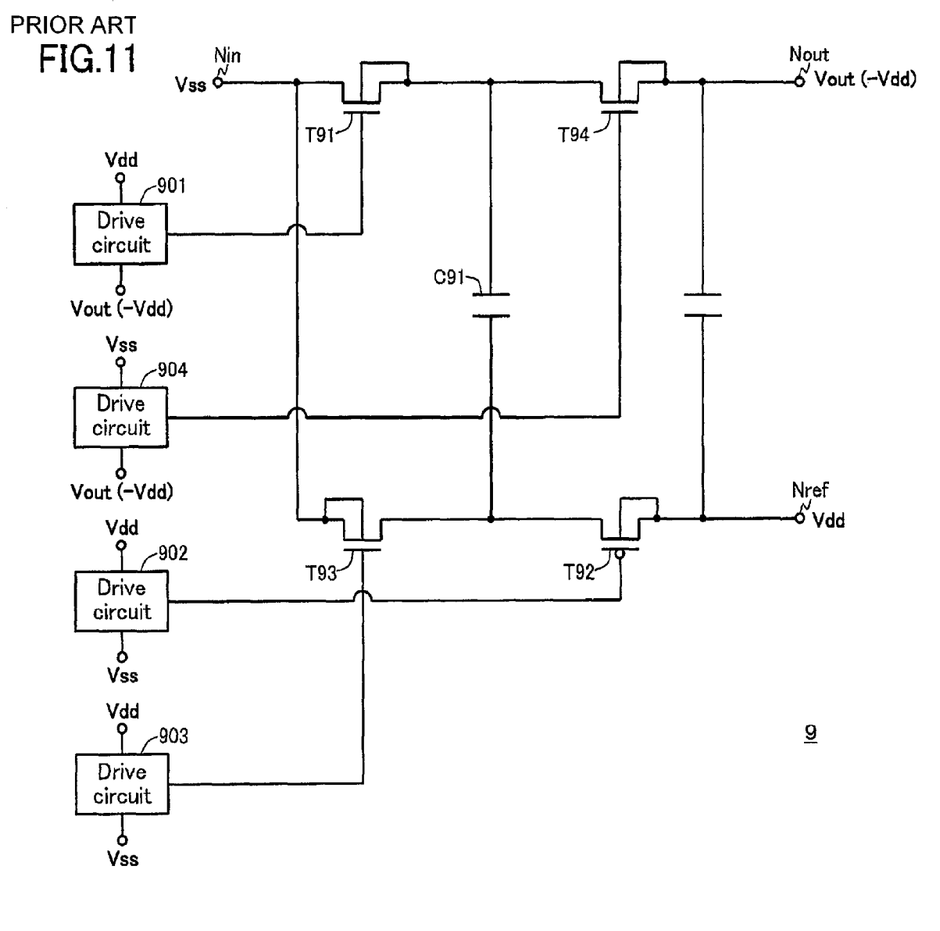
FIG. 11 is a view showing a conventional step-down charge pump circuit.

FIG. 11 shows a configuration of a general step-down charge pump circuit, which executes a charge storing operation and a charge transfer operation alternately, to thereby output a negative output voltage Vout (=−Vdd) stepped down from the ground voltage Vss by the value of the power supply voltage Vdd.

During the charge storing period, drive circuits 901, 902, 903 and 904 respectively output the power supply voltage Vdd, the ground voltage Vss, the ground voltage Vss and the output voltage Vout. With these voltage, drive transistors T91 and T92 are ON while drive transistors T93 and T94 are OFF, resultantly allowing a pumping capacitance C91 to store an amount of charge (negative charge) corresponding to the voltage difference between the power supply voltage Vdd and the ground voltage Vss.

During the charge transfer period, the drive circuits 901, 902, 903 and 904 respectively output the output voltage Vout, the power supply voltage Vdd, the power supply voltage Vdd and the ground voltage Vss. With these voltages, the drive transistors T93 and T94 are ON while the drive transistors T91 and T92 are OFF, resultantly allowing the charge (negative charge) stored in the pumping capacitance C91 to be transferred to an output node Nout.

In the step-down charge pump circuit, the drive transistors T91 and T94 can be turned OFF by supplying the output voltage Vout (−Vdd) to the gates thereof. However, if a short-to-power fault of the output node Nout (short-circuiting between the output node Nout and an unintentional high-voltage node (power supply node, for example)) occurs, the output voltage Vout at the output node Nout may become higher than the ground voltage Vss. In such an event, the drive transistors T91 and T94 will not be turned OFF but be ON even if the output voltage Vout is supplied to the gates of the drive transistors T91 and T94. Hence, both the drive transistors T91 and T94 are ON simultaneously, causing an overcurrent between an input node Nin and the output node Nout.

With occurrence of an overcurrent due to an unintentional voltage change at the output node Nout as described above, the charge pump circuit may possibly be broken down.

To address the above problem, Japanese Laid-Open Patent Publication No. 2004-320862 (Patent Document 1) discloses a DC-DC converter in which a constant voltage circuit capable of adjusting the output current amount is connected to an input node of a step-up charge pump circuit to restrict the current amount supplied to the input node, to thereby suppress an overcurrent from occurring with a short-to-ground fault. Specifically, the constant voltage circuit includes a voltage control transistor placed between an input terminal for receiving an input voltage and an output node connected to the input node of the charge pump circuit. The output current amount of the constant voltage circuit is adjusted by controlling the gate voltage of the voltage control transistor.

However, Patent Document 1 described above has the following problems. With a voltage drop occurring in the voltage control transistor of the constant voltage circuit, a voltage lower than the input voltage is supplied to the charge pump circuit. This degrades the step-up efficiency of the charge pump circuit.

Also, in Patent Document 1, it is necessary for the constant voltage circuit to have a current drive capability higher than the charge pump circuit. For example, to secure 500 mA as the output current of the charge pump circuit, the constant voltage circuit must output a current of 1 A or more. With this requirement of having such a high current drive capability, it is difficult to reduce the circuit scale of the constant voltage circuit.

SUMMARY OF THE INVENTION

An object of the present invention is providing a charge pump circuit in which occurrence of an overcurrent is suppressed without degrading its step-up (or step-down) efficiency.

According to one aspect of the present invention, the charge pump circuit is a circuit for stepping up or down an input voltage to output a stepped-up or stepped-down output voltage, including: a pumping circuit; and a protection circuit, wherein the pumping circuit includes: a pumping capacitance; a first drive transistor connected between an input node for receiving the input voltage and one terminal of the pumping capacitance; and a second drive transistor connected between an output node for outputting the output voltage and the one terminal of the pumping capacitance, in a charge storing mode, the first drive transistor is turned ON to store charge in the pumping capacitance, while in a charge transfer mode, the second drive transistor is turned ON to transfer the charge stored in the pumping capacitance to the output node, and the protection circuit puts at least one of the first and second drive transistors in a high-resistance state in which the resistance value is higher than when the transistor is ON, based on whether the output voltage is higher or lower than a predetermined judgment voltage.

In the charge pump circuit described above, if an unintentional voltage change occurs at the output node, the protection circuit puts at least one of the first and second drive transistors in a high-resistance state. This can suppress an overcurrent from flowing between the input node and the output node. Also, since it is unnecessary to provide a means for adjusting the current amount upstream of the pumping circuit, step-up (or step-down) operation can be executed without reducing the step-up (step-down) efficiency of the charge pump. Moreover, since the protection circuit can be lower in current drive capability than the pumping circuit, it is no more necessary to increase the circuit scale unlike the conventional case. The circuit scale of the charge pump circuit can therefore be reduced.

Preferably, the protection circuit includes a first protection transistor having a source connected to a first set node for receiving a first set voltage for putting the first drive transistor in the high-resistance state, a gate connected to the output node, and a drain connected to a gate of the first drive transistor.

In the charge pump circuit described above, the connection between the gate of the first drive transistor and the first set node is switched in response to whether the output voltage at the output node is higher or lower than a judgment voltage determined from the first set voltage and the threshold voltage of the first drive transistor.

Preferably, the protection circuit further includes a second protection transistor having a source connected to a second set node for receiving a second set voltage for putting the second drive transistor in the high-resistance state, a gate connected to the output node, and a drain connected to a gate of the second drive transistor.

In the charge pump circuit described above, the connection between the gate of the second drive transistor and the second set node is switched in response to whether the output voltage at the output node is higher or lower than a judgment voltage determined from the second set voltage and the threshold voltage of the second drive transistor.

Preferably, the protection circuit includes: a first comparison circuit for comparing the output voltage at the output node with the judgment voltage; and a first protection switch connected between a first set node for receiving a first set voltage for putting the first drive transistor in the high-resistance state and a gate of the first drive transistor, the first protection switch turning ON/OFF in response to a comparison result of the first comparison circuit.

In the charge pump circuit described above, the connection between the gate of the first drive transistor and the first set node is switched in response to the comparison result of the first comparison circuit.

Preferably, the protection circuit further includes: a second comparison circuit for comparing the output voltage at the output node with the judgment voltage, and a second protection switch connected between a second set node for receiving a second set voltage for putting the second drive transistor in the high-resistance state and a gate of the second drive transistor, the second protection switch turning ON/OFF in response to a comparison result of the second comparison circuit.

In the charge pump circuit described above, the connection between the gate of the second drive transistor and the second set node is switched in response to the comparison result of the second comparison circuit.

DESCRIPTION OF THE PREFERRED EMBODIMENTS

Hereinafter, preferred embodiments of the present invention will be described in detail with reference to the accompanying drawings. In the drawings, identical or equivalent components are denoted by the same reference numerals, and description thereof is not repeated.

Embodiment 1

Figure 1:
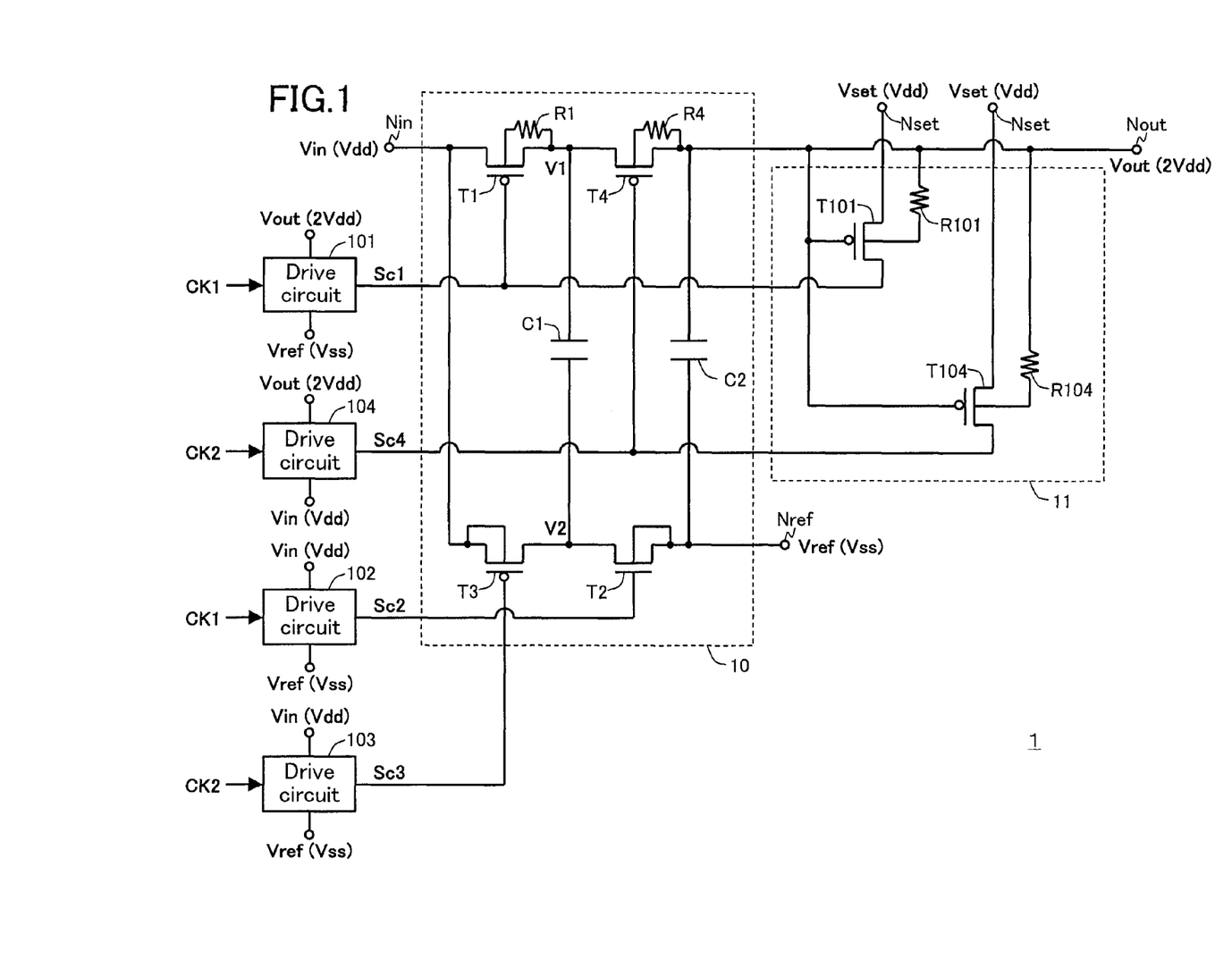
FIG. 1 is a view showing a configuration of a charge pump circuit of Embodiment 1 of the present invention.

FIG. 1 shows a configuration of a charge pump circuit 1 of Embodiment 1 of the present invention. The charge pump circuit 1 has a charge storing mode in which an amount of charge corresponding to the voltage difference between an input voltage Vin and a reference voltage Vref is stored and a charge transfer mode in which the stored charge is transferred. The charge pump circuit 1 also executes processing for suppressing occurrence of an overcurrent caused by an unintentional voltage change at an output node Nout (overcurrent suppression processing).

The charge pump circuit 1 includes a pumping circuit 10, drive circuits 101, 102, 103 and 104 and a protection circuit 11. Note herein that the charge pump circuit 1 is a step-up charge pump circuit that outputs a positive output voltage Vout, in which the input voltage Vin, the reference voltage Vref and the output voltage Vout are respectively the power supply voltage Vdd, the ground voltage Vss and a voltage "2Vdd" having a voltage value twice as large as the input voltage Vin.

[Pumping Circuit]

The pumping circuit 10 includes a pumping capacitance C1, an output capacitance C2 and drive transistors T1 to T4. While the drive transistors T1, T3 and T4 are p-type transistors, the drive transistor T2 is an n-type transistor in the illustrated example.

The drive transistor T1 is connected between the input node Nin receiving the input voltage Vin and one terminal of the pumping capacitance C1, the drive transistor T2 is connected between the other terminal of the pumping capacitance C1 and a reference node Nref receiving the reference voltage Vref, the drive transistor T3 is connected between the input node Nin and the other terminal of the pumping capacitance C1, and the drive transistor T4 is connected between the one terminal of the pumping capacitance C1 and the output node Nout. The output capacitance C2 is connected between the output node Nout and the reference node Nref. The back gates of the drive transistors T1 and T4 are respectively connected to the one terminal of the pumping capacitance C1 and the output node Nout via protection resistances R1 and R4.

(Drive Circuits)

The drive circuit 101 outputs a control signal Sc1 swinging between the output voltage Vout and the reference voltage Vref to the gate of the drive transistor T1 in response to a clock signal CK1.

The drive circuit 102 outputs a control signal Sc2 swinging between the input voltage Vin and the reference voltage Vref to the gate of the drive transistor T2 in response to the clock signal CK1.

The drive circuit 103 outputs a control signal Sc3 swinging between the input voltage Vin and the reference voltage Vref to the gate of the drive transistor T3 in response to a clock signal CK2.

The drive circuit 104 outputs a control signal Sc4 swinging between the output voltage Vout and the input voltage Vin to the gate of the drive transistor T4 in response to the clock signal CK2.

The drive circuits 101 to 104 may be composed of a delay circuit, an inverter, a level shifter and the like.

[Normal Operation]

Figure 2:
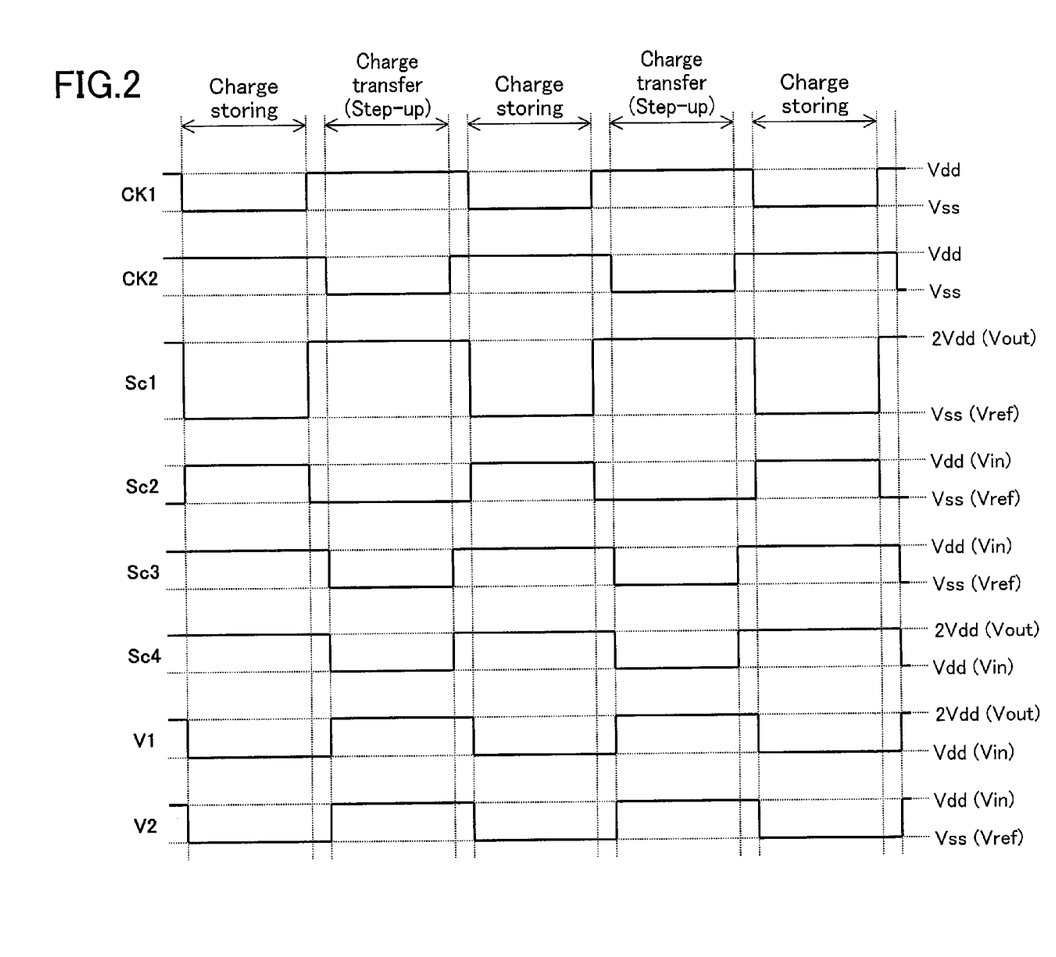
FIG. 2 is a timing chart presented to describe the operation of the charge pump circuit of FIG. 1.

Normal operation of the charge pump circuit 1 of FIG. 1 will be described with reference to FIG. 2.

During a charge storing period, the clock signal CK1 shifts from high to low. In response to this level shift, the drive circuit 101 makes the control signal Sc1 low (Vss), and the drive circuit 102 makes the control signal Sc2 high (Vdd). Hence, the drive transistors T1 and T2 are turned ON from OFF. Contrarily, since the clock signal CK2 remains high, the control signals Sc3 and Sc4 remain high (Vdd and 2Vdd, respectively), and thus the drive transistors T3 and T4 remain OFF. As a result, the pumping capacitance C1 is connected to the input node Nin at one terminal and to the reference node Nref at the other terminal, storing an amount of charge (positive charge) corresponding to the voltage difference between the input voltage Vin (power supply voltage Vdd) and the reference voltage Vref (ground voltage Vss).

During a charge transfer period (step-up period in the illustrated example), since the clock signal CK1 remains high, the control signals Sc1 and Sc2 remain high (2Vdd) and low (Vss), respectively, and thus the drive transistors T1 and T2 remain OFF. Contrarily, the clock signal CK2 shifts from high to low. In response to this level shift, the drive circuit 103 makes the control signal Sc3 low (Vss), and the drive circuit 104 makes the control signal Sc4 low (Vdd). Hence, the drive transistors T3 and T4 are turned ON from OFF. As a result, the pumping capacitance C1 is connected to the output node Nout at the one terminal and to the input node Nin at the other terminal, transferring the charge (positive charge) stored in the pumping capacitance C1 to the output node Nout, to thereby boost the output node Nout.

[Protection Circuit]

The protection circuit 11 shown in FIG. 1 monitors the output voltage Vout and turns OFF the drive transistors T1 and T4 if the voltage at the output node Nout (output voltage Vout) is lower than a predetermined judgment voltage. The judgment voltage is a voltage serving as a criterion of judgment on an unintentional voltage change at the output node Nout (for example, it may be the input voltage Vin or a value near the input voltage Vin). The protection circuit includes protection transistors T101 and T104 that are p-type transistors.

The protection transistor T101 is connected to a set node Nset receiving a set voltage Vset at its source, to the gate of the drive transistor T1 at its drain and to the output node Nout at its gate. The set voltage Vset is a voltage for putting the drive transistors T1 and T4 in a high resistance state (state in which the resistance value is higher than in the ON state, such as the OFF state, for example). The set voltage Vset is the power supply voltage Vdd in the illustrated example.

The protection transistor T104 is connected to the set node Nset at its source, to the gate of the drive transistor T4 at its drain and to the output node Nout at its gate.

The back gates of the protection transistors T101 and T104 are respectively connected to the output node Nout via protection resistances R101 and R104.

[Overcurrent Suppression Processing]

Next, the overcurrent suppression processing by means of the protection circuit 11 will be described. Note herein that the judgment voltage is "Vdd−Vthp" where "Vthp" is the threshold voltage of the protection transistors T101 and T104.

When the output voltage Vout at the output node Nout is higher than the judgment voltage (Vdd−Vthp), the protection transistor T101 is OFF, separating the gate of the drive transistor T1 from the set node Nset. The drive transistor T1 therefore turns ON/OFF in response to the control signal Sc1. At this time, the protection transistor T104 is also OFF, allowing the drive transistor T4 to turn ON/OFF in response to the control signal Sc4.

If the output voltage Vout becomes lower than the judgment voltage (Vdd−Vthp) due to occurrence of an unintentional voltage drop at the output node Nout, such as a short-to-ground fault of the output node Nout (short-circuiting between the output node Nout and an unintentional low-voltage node (the ground node, for example)), the protection transistor T101 becomes ON, connecting the gate of the drive transistor T1 to the set node Nset. With this connection, the gate voltage of the drive transistor T1 is fixed at the set voltage Vset, forcing the drive transistor T1 to the OFF state irrespective of the voltage level of the control signal Sc1. At this time, the protection transistor T104 also becomes ON, connecting the gate of the drive transistor T4 to the set node Nset. The drive transistor T4 is therefore forced to the OFF state irrespective of the voltage level of the control signal Sc4.

As described above, if an unintentional voltage change (unintentional voltage drop in the illustrated example) occurs at the output node Nout, the protection circuit 11 forcefully turns OFF the drive transistors T1 and T4. In this way, occurrence of an overcurrent between the input node Nin and the output node Nout can be suppressed.

Also, since it is unnecessary to provide a means for adjusting the current amount at a position upstream of the pumping circuit 10, the normal operation can be executed without degrading the step-up efficiency of the charge pump circuit 1.

The protection circuit 11 may have about the same current drive capability as the drive circuits 101 to 104. The current drive capability of the drive circuits 101 to 104 is normally lower than that of the pumping circuit 10. Hence, since the protection circuit 11 can only have a current drive capability smaller than that of the pumping circuit 10, it is no more necessary to increase the circuit scale unlike the conventional case. The circuit scale of the charge pump circuit 1 can therefore be reduced.

Also, with the protection resistance R1 connected between the back gate of the drive transistor T1 and the one terminal of the pumping capacitance C1, the current amount of an overcurrent flowing via a parasitic diode of the drive transistor T1 can be reduced. Likewise, with the protection resistances R4, R101 and R104 respectively provided for the drive transistor T2 and the protection transistors T101 and T102, the current amounts at parasitic diodes in the respective transistors can be reduced. This can further suppress occurrence of an overcurrent caused by an unintentional change in the output voltage Vout. The protection resistances R1, R2, R101 and R104 may be replaced with switches operating in response to ON/OFF of the protection transistors T101 and T104. In this case, also, the current amount at a parasitic diode can be reduced.

Figure 3:
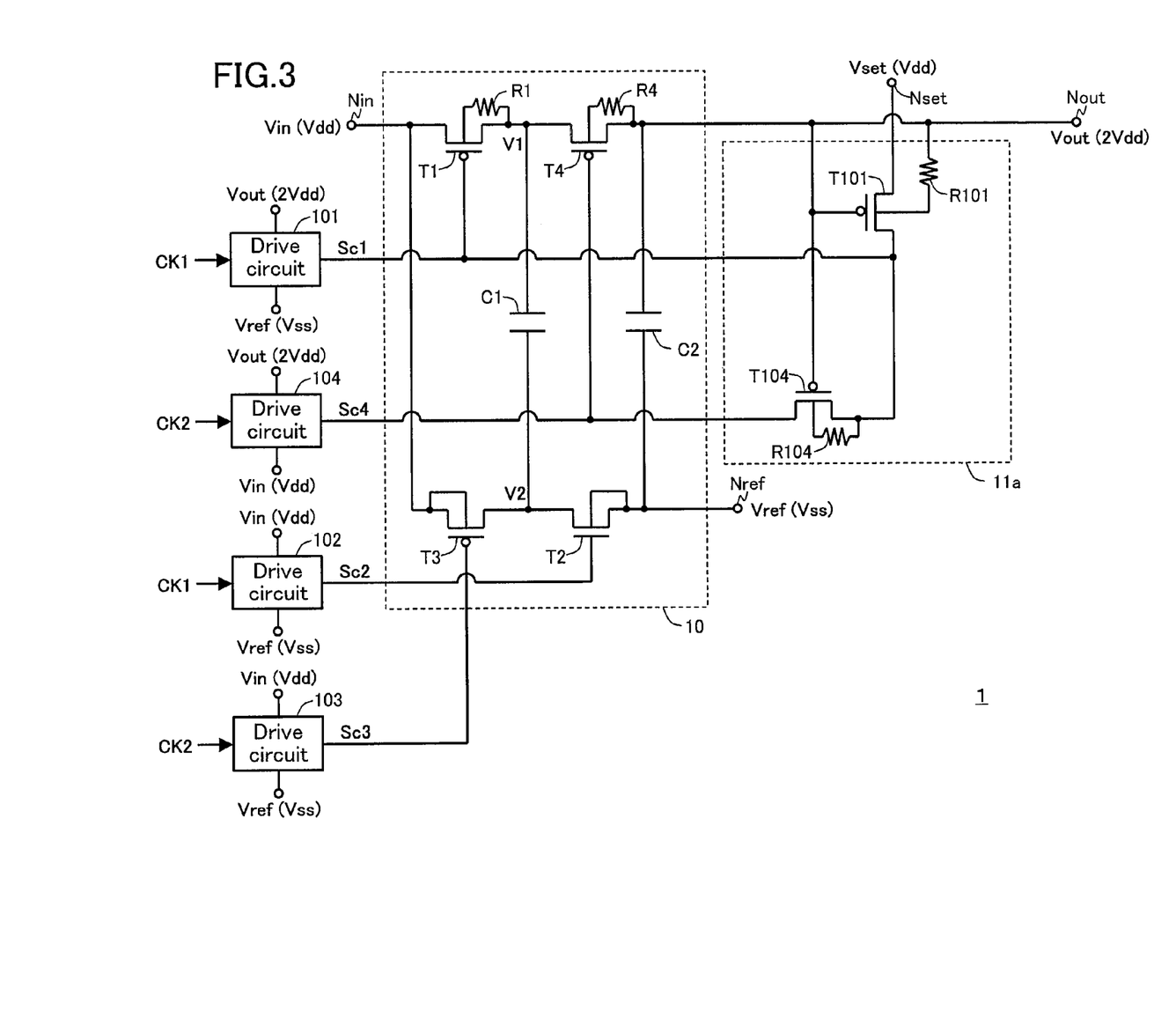
FIG. 3 is a view showing an alteration to the charge pump circuit of FIG. 1.

The connection of the protection transistors T101 and T104 may be changed as shown in FIG. 3. In a protection circuit 11a shown in FIG. 3, the source of the protection transistor T104 is connected to the set node Nset via the protection transistor T101. In this case, also, the drive transistors T1 and T4 can be turned OFF if an unintentional voltage drop occurs at the output node Nout.

Embodiment 2

Figure 4:
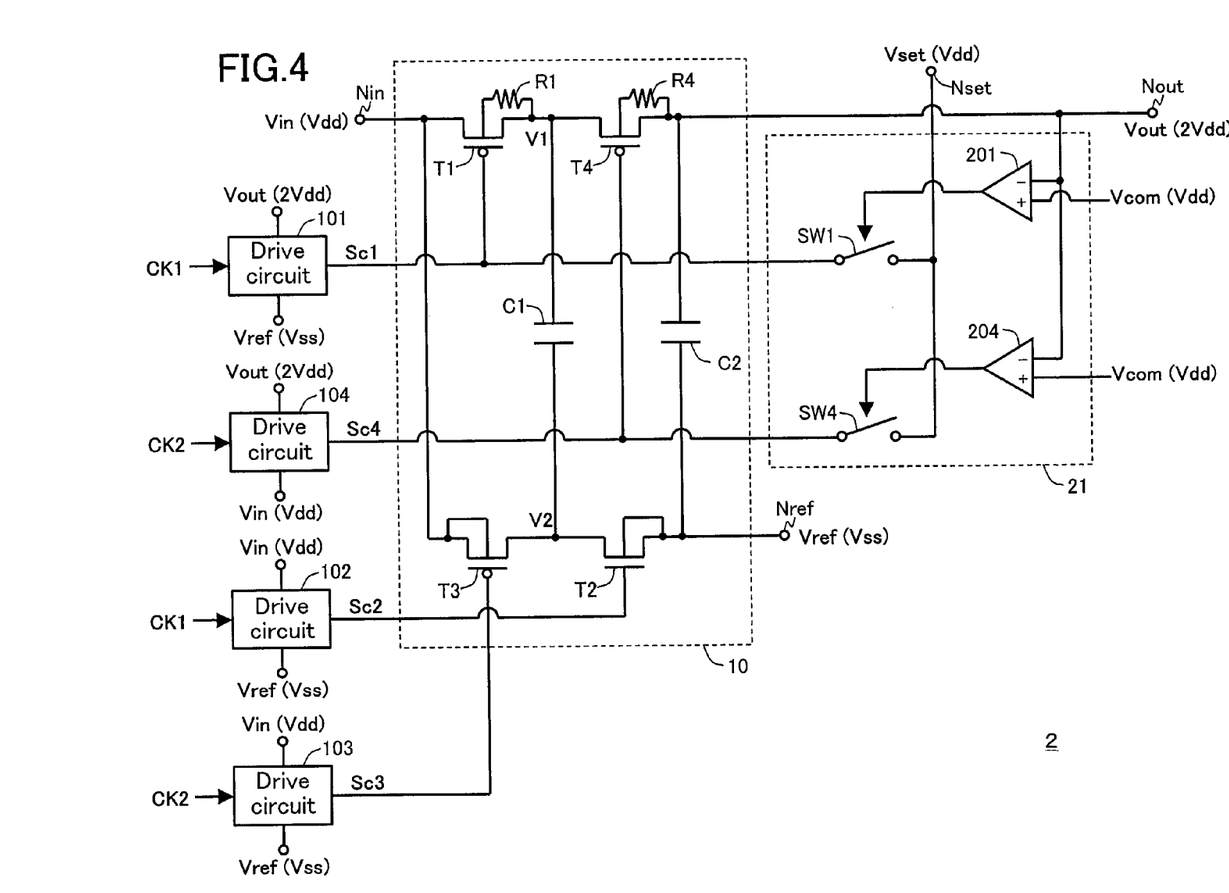
FIG. 4 is a view showing a configuration of a charge pump circuit of Embodiment 2 of the present invention.

FIG. 4 shows a configuration of a charge pump circuit 2 of Embodiment 2 of the present invention. The charge pump circuit 2 includes a protection circuit 21 in place of the protection circuit 11 shown in FIG. 1. The other components are the same as those in FIG. 1.

[Protection Circuit]

The protection circuit 21 includes comparators 201 and 204 and protection switches SW1 and SW4.

The comparators 201 and 204 compare the output voltage Vout with a judgment voltage Vcom, which is Vdd in the illustrated example. The protection switch SW1, connected between the set node Nset and the gate of the drive transistor T1, turns ON/OFF in response to the comparison result of the comparator 201. The protection switch SW4, connected between the set node Nset and the gate of the drive transistor T4, turns ON/OFF in response to the comparison result of the comparator 204. In the illustrated example, the switches SW1 and SW4 are ON if the output voltage Vout is lower than the judgment voltage Vcom.

[Overcurrent Suppression Processing]

When the output voltage Vout at the output node Nout is higher than the judgment voltage Vcom (Vdd), the switches SW1 and SW4 are OFF, separating the gates of the drive transistors T1 and T4 from the set node Nset. The drive transistors T1 and T4 are therefore allowed to turn ON/OFF in response to the control signals Sc1 and Sc4, respectively.

If the output voltage Vout becomes lower than the judgment voltage Vcom (Vdd) due to occurrence of an unintentional voltage drop at the output node, the switches SW1 and SW4 become ON, connecting the gates of the drive transistors T1 and T4 to the set node Nset. With this connection, the gate voltages of the drive transistors T1 and T4 are fixed at the set voltage Vset, and thus the drive transistors T1 and T4 are forced to the OFF state irrespective of the voltage levels of the control signals Sc1 and Sc4.

As described above, if an unintentional voltage change (unintentional voltage drop in the illustrated example) occurs at the output node Nout, the protection circuit 21 forcefully turns OFF the drive transistors T1 and T4. In this way, occurrence of an overcurrent between the input node Nin the output node Nout can be suppressed.

Also, since it is unnecessary to provide a means for adjusting the current amount at a position upstream of the pumping circuit 10, the normal operation can be executed without degrading the step-up efficiency of the charge pump circuit 2.

The protection circuit 21 may be smaller in current drive capability than the pumping circuit 10. Hence, unlike the conventional case, it is no more necessary to increase the circuit scale. The circuit scale of the charge pump circuit 2 can therefore be reduced.

Figure 5:
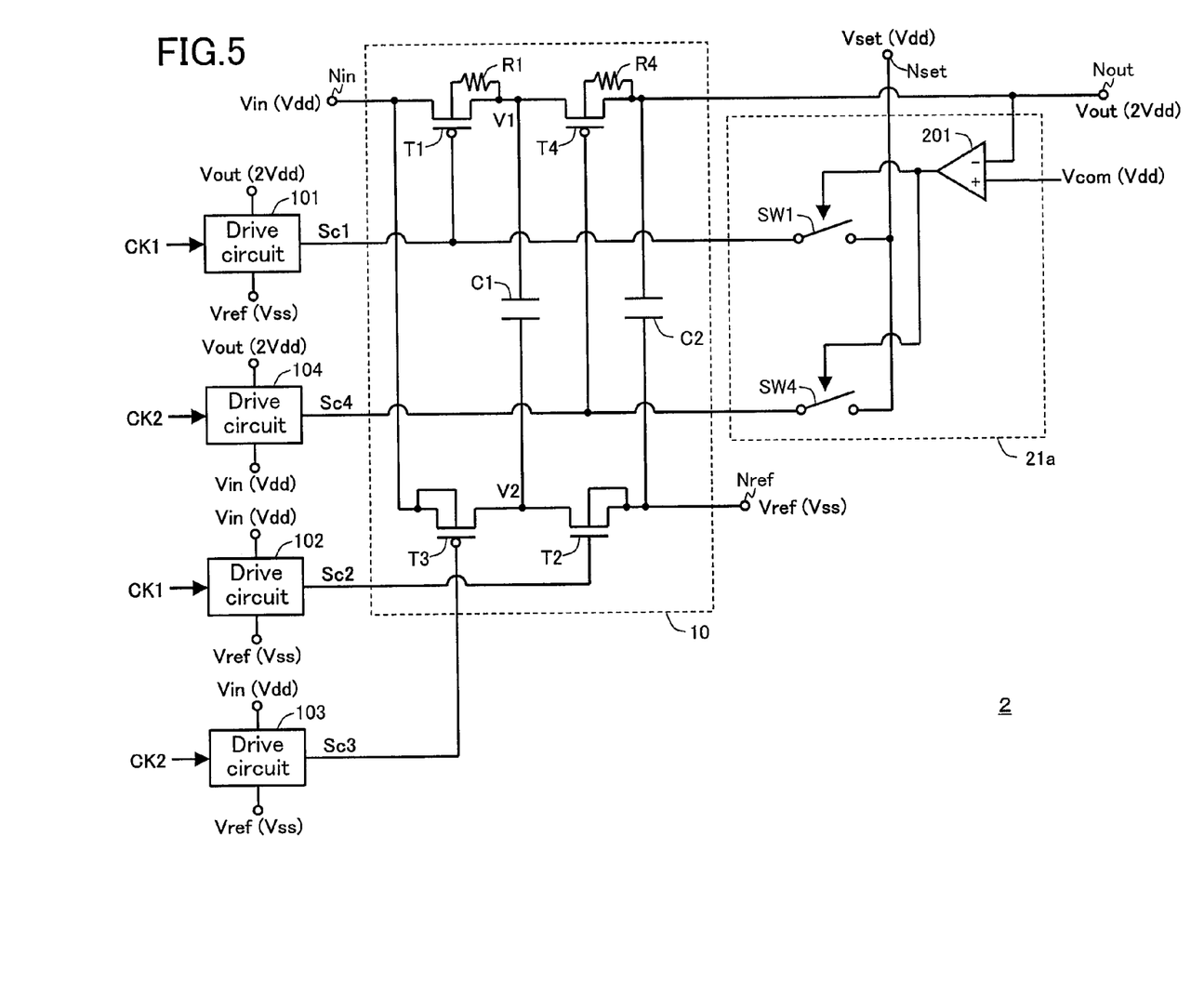
FIG. 5 is a view showing an alteration to the charge pump circuit of FIG. 4.

The comparator 204 may be omitted from the protection circuit as shown in FIG. 5. In a protection circuit 21a shown in FIG. 5, the protection switch SW4 turns ON/OFF in response to the comparison result of the comparator 201.

Figure 6:
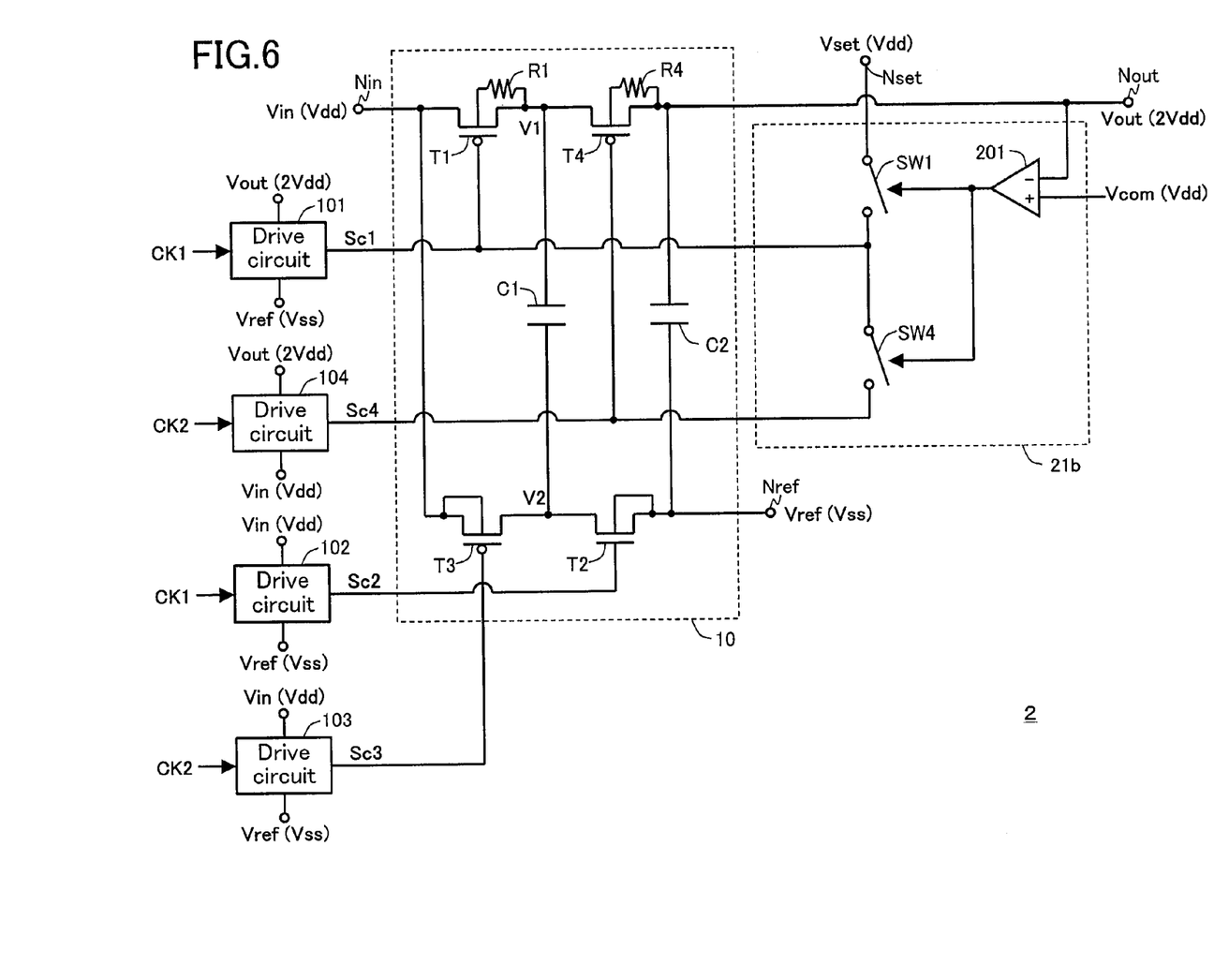
FIG. 6 is a view showing another alteration to the charge pump circuit of FIG. 4.

Also, the connection of the switches SW1 and SW4 may be changed as shown in FIG. 6. In a protection circuit 21b shown in FIG. 6, one terminal of the switch SW4 is connected to the set node Nset via the switch SW1. In this case, also, the drive transistors T1 and T4 can be turned OFF if the output voltage Vout at the output node Nout is lower than the judgment voltage Vcom (Vdd).

(Step-Down Charge Pump Circuit)

Figure 7:
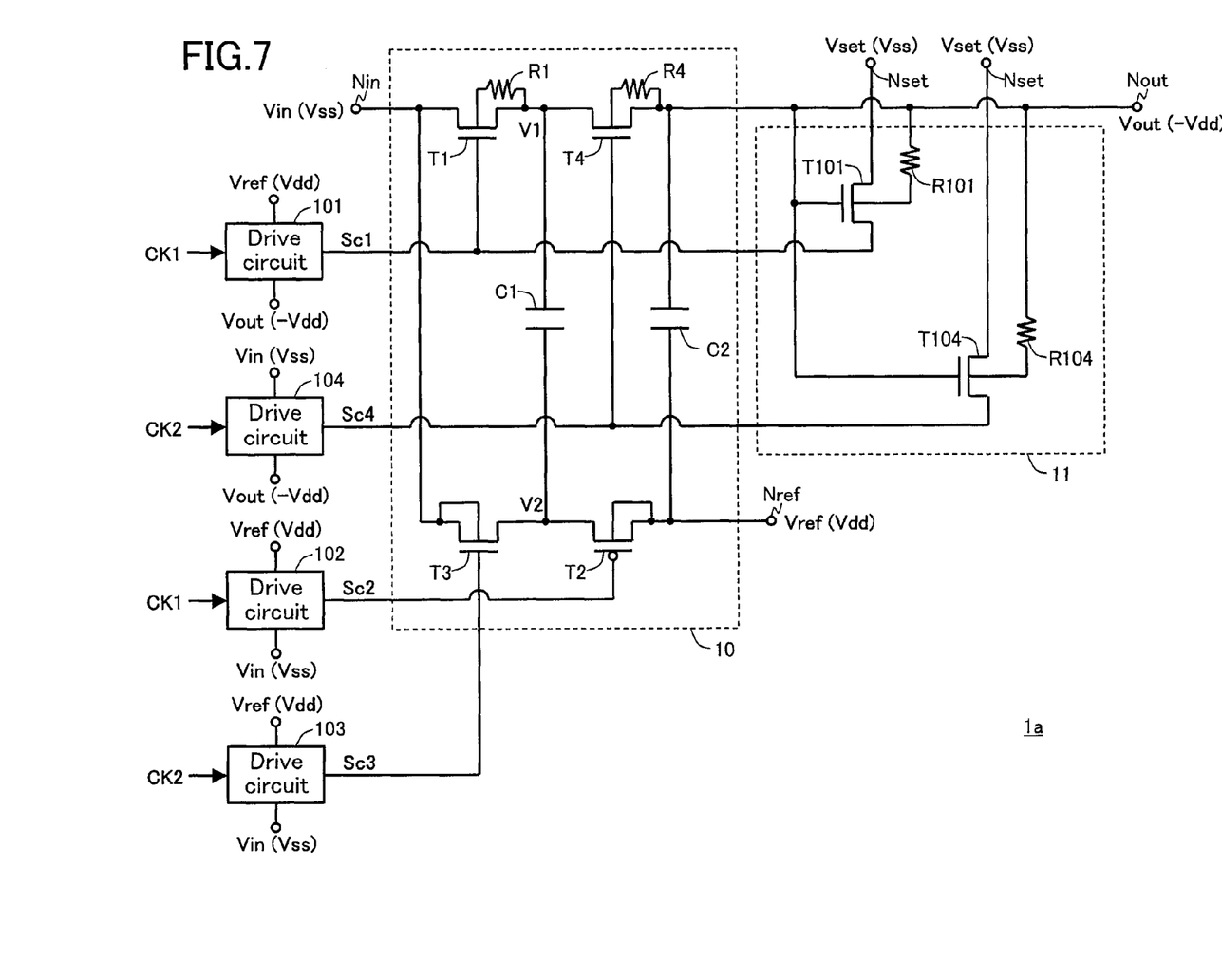
FIG. 7 is a view showing an example of use of the charge pump circuit of FIG. 1 as a step-down charge pump circuit.

As shown in FIG. 7, the charge pump circuit of Embodiment 1 is usable, not only as the step-up charge pump circuit, but also as a step-down charge pump circuit. In a step-down charge pump circuit 1a of FIG. 7, while the drive transistors T1, T3 and T4 are n-type transistors, the drive transistor T2 is a p-type transistor. In FIG. 7, the input voltage Vin and the reference voltage Vref are respectively the ground voltage Vss and the power supply voltage Vdd. The charge pump circuit 1a outputs a negative output voltage Vout (−Vdd) stepped down from the input voltage Vin (Vss) by the value of the reference voltage Vref (Vdd).

[Normal Operation]

Figure 8:
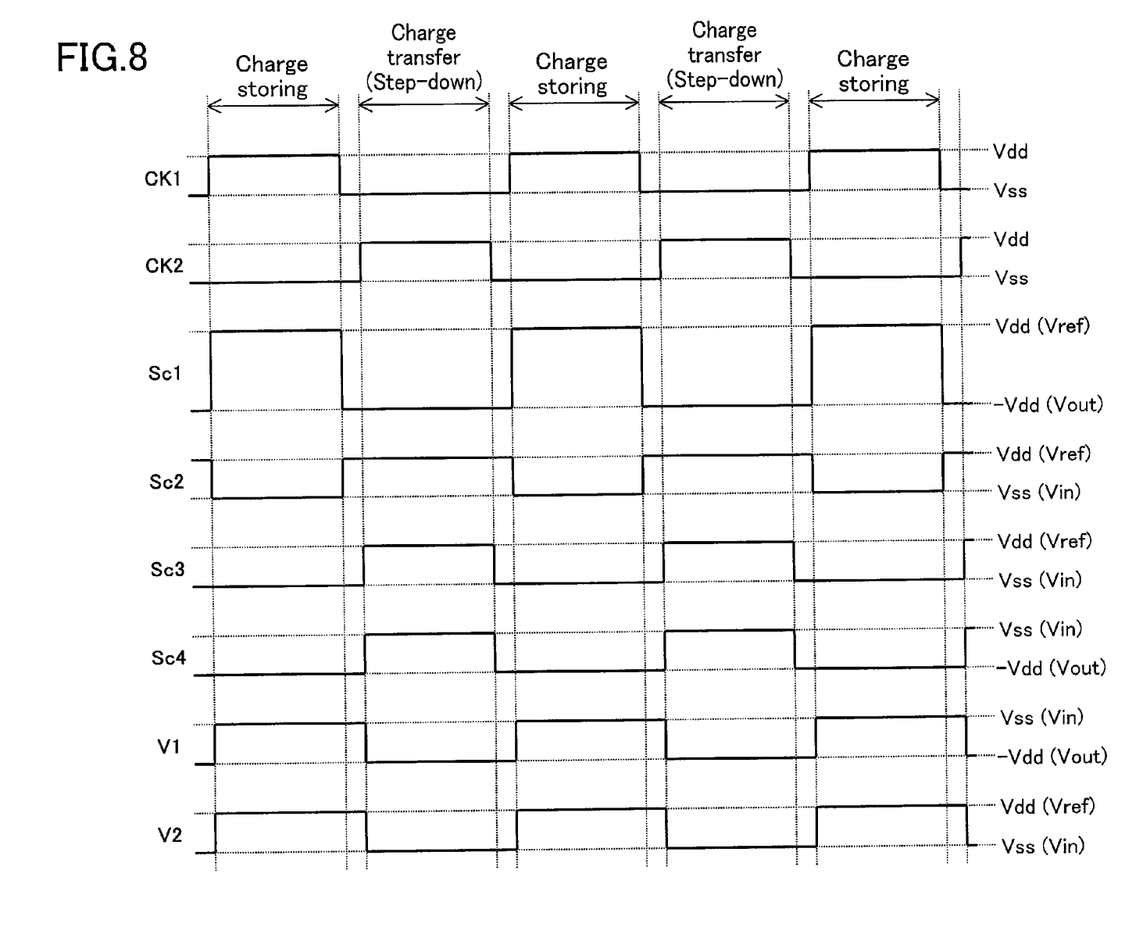
FIG. 8 is a timing chart presented to describe the operation of the charge pump circuit of FIG. 7.

Normal operation of the step-down charge pump circuit 1a of FIG. 7 will be described with reference to FIG. 8.

During a charge storing period, the clock signal CK1 shifts from low to high. In response to this level shift, the drive circuit 101 makes the control signal Sc1 high (Vdd), and the drive circuit 102 makes the control signal Sc2 low (Vss). Hence, the drive transistors T1 and T2 shift from OFF to ON. Contrarily, since the clock signal CK2 remains low, the control signals Sc3 and Sc4 remain low (Vss and −Vdd, respectively), and thus the drive transistors T3 and T4 remain OFF. As a result, the pumping capacitance C1 is connected to the input node Nin at one terminal and to the reference node Nref at the other terminal, storing an amount of charge (negative charge) corresponding to the voltage difference between the power supply voltage Vdd and the ground voltage Vss.

During a charge transfer period (step-down period in the illustrated example), since the clock signal CK1 remains low, the control signals Sc1 and Sc2 remain low (−Vdd) and high (Vdd), respectively, and thus the drive transistors T1 and T2 remain OFF. Contrarily, the clock signal CK2 shifts from low to high. In response to this level shift, the drive circuit 103 makes the control signal Sc3 high (Vdd), and the drive circuit 104 makes the control signal Sc4 high (Vss). Hence, the drive transistors T3 and T4 shift from OFF to ON. As a result, the pumping capacitance C1 is connected to the output node Nout at the one terminal and to the input node Nin at the other terminal, transferring the charge (negative charge) stored in the pumping capacitance C1 to the output node Nout.

[Protection Circuit]

In FIG. 7, the protection circuit 11 monitors the output voltage Vout at the output node Nout, and turns OFF the drive transistors T1 and T2 if the output voltage Vout is higher than a predetermined judgment voltage. Note herein that the protection transistors T101 and T104 are n-type transistors and that the set voltage Vset is the ground voltage Vss.

[Overcurrent Suppression Processing]

Next, the overcurrent suppression processing by means of the protection circuit 11 shown in FIG. 7 will be described. Note herein that the judgment voltage is "Vss+Vthn" where "Vthn" is the threshold voltage of the protection transistors T101 and T104.

When the output voltage Vout at the output node Nout is lower than the judgment voltage (Vdd+Vthn), the protection transistor T101 is OFF, separating the gate of the drive transistor T1 from the set node Nset. The drive transistor T1 therefore turns ON/OFF in response to the control signal Sc1. At this time, the protection transistor T104 is also OFF, allowing the drive transistor T4 to turn ON/OFF in response to the control signal Sc4.

If the output voltage Vout becomes higher than the judgment voltage (Vss+Vthn) due to occurrence of an unintentional voltage rise at the output node Nout, such as a short-to-power fault of the output node Nout (short-circuiting between the output node Nout and an unintentional high-voltage node (the power supply node, for example)), the protection transistor T101 becomes ON, connecting the gate of the drive transistor T1 to the set node Nset. With this connection, the gate voltage of the drive transistor T1 is fixed at the set voltage Vset, forcing the drive transistor T1 to the OFF state irrespective of the voltage level of the control signal Sc1. At this time, the protection transistor T104 also becomes ON, connecting the gate of the drive transistor T4 to the set node Nset. The drive transistor T4 is therefore forced to the OFF state irrespective of the voltage level of the control signal Sc4.

As described above, if an unintentional voltage change (unintentional voltage rise in the illustrated example) occurs at the output node Nout, the protection circuit 11 forcefully turns OFF the drive transistors T1 and T4. In this way, occurrence of an overcurrent between the input node Nin and the output node Nout can be suppressed.

Figure 9:
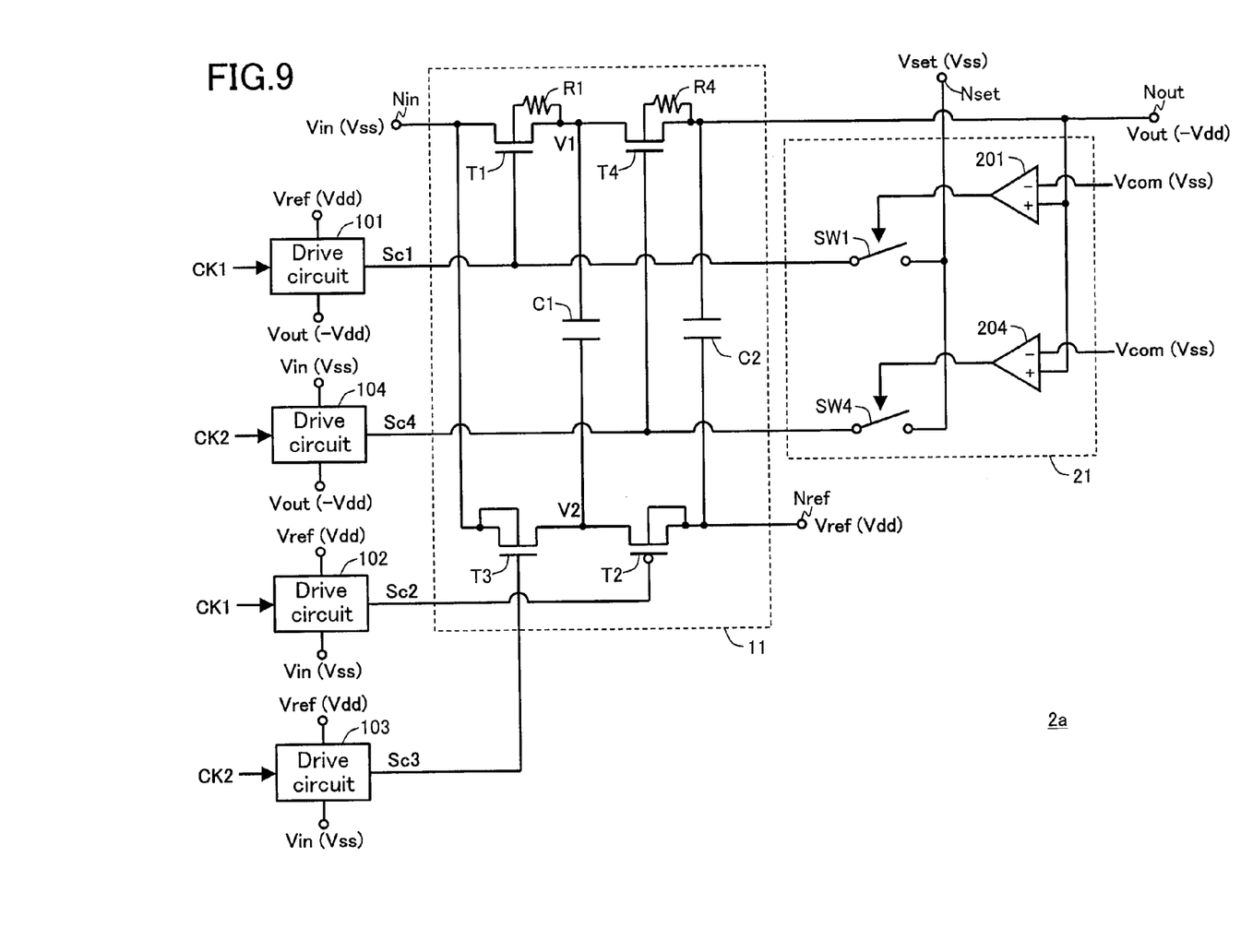
FIG. 9 is a view showing an example of use of the charge pump circuit of FIG. 4 as a step-down charge pump circuit.

The charge pump circuit of Embodiment 2 is also usable as a step-down charge pump circuit as shown in FIG. 9. In a charge pump circuit 2a of FIG. 9, the switches SW1 and SW4 become ON if the output voltage Vout is higher than the judgment voltage Vcom. The judgment voltage Vcom is the ground voltage Vss in the illustrated example.

The overcurrent suppression processing by means of the protection circuit 21 shown in FIG. 9 will be described.

When the output voltage Vout at the output node Nout is lower than the judgment voltage Vcom (Vss), the switches SW1 and SW4 are OFF, separating the gates of the drive transistors T1 and T4 from the set node Nset. The drive transistors T1 and T4 are therefore allowed to turn ON/OFF in response to the control signals Sc1 and Sc4, respectively.

If the output voltage Vout becomes higher than the judgment voltage Vcom (Vss) due to occurrence of an unintentional voltage rise at the output node Nout, the switches SW1 and SW4 become ON, connecting the gates of the drive transistors T1 and T4 to the set node Nset. With this connection, the gate voltages of the drive transistors T1 and T4 are fixed at the set voltage Vset, forcing the drive transistors T1 and T4 to the OFF state irrespective of the voltage levels of the control signals Sc1 and Sc4.

As described above, if an unintentional voltage change (unintentional voltage rise in the illustrated example) occurs at the output node Nout, the protection circuit 21 forcefully turns OFF the drive transistors T1 and T4. In this way, occurrence of an overcurrent between the input node Nin the output node Nout can be suppressed.

Other Embodiments

In the above embodiments, the protection circuit includes two protection transistors T101 and T104 (or two switches SW1 and SW4) for the two drive transistors T1 and T4. However, occurrence of an overcurrent caused by an unintentional voltage change can be suppressed if only at least either one protection transistor (or at least either one switch) is provided.

Also, in the above embodiments, although the same set voltage Vset is supplied to the drive transistors T1 and T4, different set voltages Vset may be supplied to the drive transistors T1 and T4. When the set voltage Vset is equal to the input voltage Vin, the input node Nin may be used as the set node Nset. For example, in the charge pump circuit 1 of FIG. 1, the sources of the protection transistors T101 and T104 may be connected to the input node Nin.

As described above, the charge pump circuit of the present invention, capable of suppressing occurrence of an overcurrent without degrading its step-up (or step-down) efficiency, is usable as a power supply circuit for electronic apparatuses such as cellular phones, digital video cameras and digital still cameras, and the like.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A charge pump circuit for stepping up or down an input voltage to output a stepped-up or stepped-down output voltage, comprising:
   a pumping circuit; and
   a protection circuit,
   wherein the pumping circuit comprises:
   a pumping capacitance;
   a first drive transistor connected between an input node for receiving the input voltage and one terminal of the pumping capacitance; and
   a second drive transistor connected between an output node for outputting the output voltage and the one terminal of the pumping capacitance, wherein
   in a charge storing mode, the first drive transistor is turned ON to store charge in the pumping capacitance, while in a charge transfer mode, the second drive transistor is turned ON to transfer the charge stored in the pumping capacitance to the output node, and
   if the output voltage is lower than a judgment voltage during stepping up then the protection circuit puts at least one of the first and second drive transistors in a high-resistance state in which the resistance value is higher than when the transistor is ON, said judgment voltage is equal to or lower than the input voltage.

2. The charge pump circuit of claim 1, wherein the protection circuit comprises a first protection transistor having a source connected to a first set node for receiving a first set voltage for putting the first drive transistor in the high-resistance state, a gate connected to the output node, and a drain connected to a gate of the first drive transistor.

3. The charge pump circuit of claim 2, wherein the protection circuit further comprises a second protection transistor having a source connected to a second set node for receiving a second set voltage for putting the second drive transistor in the high-resistance state, a gate connected to the output node, and a drain connected to a gate of the second drive transistor.

4. The charge pump circuit of claim 1, wherein the protection circuit comprises:
a first comparison circuit for comparing the output voltage at the output node with the judgment voltage; and
a first protection switch connected between a first set node for receiving a first set voltage for putting the first drive transistor in the high-resistance state and a gate of the first drive transistor, the first protection switch turning ON/OFF in response to a comparison result of the first comparison circuit.

5. The charge pump circuit of claim 4, wherein the protection circuit further comprises:
a second comparison circuit for comparing the output voltage at the output node with the judgment voltage, and
a second protection switch connected between a second set node for receiving a second set voltage for putting the second drive transistor in the high-resistance state and a gate of the second drive transistor, the second protection switch turning ON/OFF in response to a comparison result of the second comparison circuit.

6. The charge pump circuit of claim 4, wherein the protection circuit further comprises:
a second protection switch connected between a second set node for receiving a second set voltage for putting the second drive transistor in the high-resistance state and a gate of the second drive transistor, the second protection switch turning ON/OFF in response to the comparison result of the first comparison circuit.

7. The charge pump circuit of claim 2, wherein the first set node is the input node.

8. The charge pump circuit of claim 3, wherein the second set node is the input node.

9. An electronic apparatus comprising the charge pump circuit of claim 1.

10. A charge pump circuit for stepping up or down an input voltage to output a stepped-up or stepped-down output voltage, comprising:
a pumping circuit; and
a protection circuit,
wherein the pumping circuit comprises:
a pumping capacitance;
a first drive transistor connected between an input node for receiving the input voltage and one terminal of the pumping capacitance; and
a second drive transistor connected between an output node for outputting the output voltage and the one terminal of the pumping capacitance, wherein in a charge storing mode, the first drive transistor is turned ON to store charge in the pumping capacitance, while in a charge transfer mode, the second drive transistor is turned ON to transfer the charge stored in the pumping capacitance to the output node, and if the output voltage is higher than a judgment voltage during stepping down then the protection circuit puts at least one of the first and second drive transistors in a high-resistance state in which the resistance value is higher than when the transistor is ON, said judgment voltage is equal to or higher than the input voltage.

11. The charge pump circuit of claim 10, wherein the protection circuit comprises a first protection transistor having a source connected to a first set node for receiving a first set voltage for putting the first drive transistor in the high-resistance state, a gate connected to the output node, and a drain connected to a gate of the first drive transistor.

12. The charge pump circuit of claim 11, wherein the protection circuit further comprises a second protection transistor having a source connected to a second set node for receiving a second set voltage for putting the second drive transistor in the high-resistance state, a gate connected to the output node, and a drain connected to a gate of the second drive transistor.

13. The charge pump circuit of claim 10, wherein the protection circuit comprises:
a first comparison circuit for comparing the output voltage at the output node with the judgment voltage; and
a first protection switch connected between a first set node for receiving a first set voltage for putting the first drive transistor in the high-resistance state and a gate of the first drive transistor, the first protection switch turning ON/OFF in response to a comparison result of the first comparison circuit.

14. The charge pump circuit of claim 13, wherein the protection circuit further comprises:
a second comparison circuit for comparing the output voltage at the output node with the judgment voltage, and
a second protection switch connected between a second set node for receiving a second set voltage for putting the second drive transistor in the high-resistance state and a gate of the second drive transistor, the second protection switch turning ON/OFF in response to a comparison result of the second comparison circuit.

15. The charge pump circuit of claim 13, wherein the protection circuit further comprises:
a second protection switch connected between a second set node for receiving a second set voltage for putting the second drive transistor in the high-resistance state and a gate of the second drive transistor, the second protection switch turning ON/OFF in response to the comparison result of the first comparison circuit.

16. The charge pump circuit of claim 11, wherein the first set node is the input node.

17. The charge pump circuit of claim 12, wherein the second set node is the input node.

18. An electronic apparatus comprising the charge pump circuit of claim 10.

* * * * *